United States Patent
Sun

(10) Patent No.: US 10,784,493 B2
(45) Date of Patent: Sep. 22, 2020

(54) CHARGER, ELECTRONIC DEVICE, CHARGING SYSTEM AND CHARGING METHOD

(71) Applicant: BOE TECHNOLOGY GROUP CO., LTD., Beijing (CN)

(72) Inventor: Junmin Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 15/927,242

(22) Filed: Mar. 21, 2018

(65) Prior Publication Data

US 2019/0109316 A1    Apr. 11, 2019

(30) Foreign Application Priority Data

Oct. 10, 2017 (CN) .......................... 2017 1 0936889

(51) Int. Cl.
*H01M 2/34* (2006.01)
*H01M 10/44* (2006.01)
*H02J 7/00* (2006.01)

(52) U.S. Cl.
CPC ........... *H01M 2/345* (2013.01); *H01M 10/44* (2013.01); *H02J 7/0042* (2013.01); *H01M 2220/30* (2013.01); *H02J 7/0036* (2013.01)

(58) Field of Classification Search
CPC .. H01M 2/345; H01M 10/44; H01M 2220/30; H02J 7/0042; H02J 7/0036; H02J 2007/005
USPC .......................................................... 320/107
See application file for complete search history.

(56) References Cited

U.S. PATENT DOCUMENTS

| | | | | | |
|---|---|---|---|---|---|
| 4,191,917 A | * | 3/1980 | Brown | ................. | H01M 10/46 307/150 |
| 5,635,814 A | * | 6/1997 | Afzal | .................... | H01M 2/105 320/111 |
| 7,227,327 B2 | * | 6/2007 | Im | ....................... | G05D 1/0225 318/568.12 |
| 8,164,875 B1 | * | 4/2012 | Ledbetter | ................ | H02B 3/00 361/115 |
| 9,306,431 B2 | * | 4/2016 | Erdmann | ............... | H01H 9/168 |
| 9,921,614 B2 | * | 3/2018 | Ellis | ..................... | H01R 31/065 |

(Continued)

FOREIGN PATENT DOCUMENTS

| CN | 103036261 A | 4/2013 |
|---|---|---|
| CN | 203503929 U | 3/2014 |

(Continued)

OTHER PUBLICATIONS

First Office Action for Chinese Patent Application No. 201710936889.8 dated Jun. 3, 2019.

*Primary Examiner* — M Baye Diao
(74) *Attorney, Agent, or Firm* — Calfee, Halter & Griswold LLP

(57) ABSTRACT

The present disclosure relates to the technical field for charging an electrical appliance and provides a charger. The charger includes a base plate; and a first charge terminal and a control circuit disposed on the base plate. When the first charge terminal is connected with a charge plug, the first charge terminal switches from an extension position to a retraction position. The control circuit is configured to control the first charge terminal to be on-state when the first charge terminal is in the retraction position.

10 Claims, 5 Drawing Sheets

(56) References Cited

U.S. PATENT DOCUMENTS

| | | | |
|---|---|---|---|
| 10,574,069 B2* | 2/2020 | Chien | F21V 33/00 |
| 2006/0273749 A1* | 12/2006 | Im | G05D 1/0225 |
| | | | 318/587 |
| 2012/0098492 A1* | 4/2012 | Sulem | H01R 24/28 |
| | | | 320/111 |
| 2015/0288203 A1* | 10/2015 | Ahn | H02J 7/0042 |
| | | | 320/107 |
| 2016/0209885 A1* | 7/2016 | Ellis | G06F 1/189 |
| 2016/0336789 A1* | 11/2016 | Hyun | H02J 7/025 |
| 2017/0117729 A1* | 4/2017 | Hirose | A63F 13/90 |
| 2017/0341690 A1* | 11/2017 | Pikulski | B62D 51/001 |
| 2017/0346321 A1* | 11/2017 | Lemberg | H02J 7/342 |

FOREIGN PATENT DOCUMENTS

| | | |
|---|---|---|
| CN | 203590632 U | 5/2014 |
| CN | 203761083 U | 8/2014 |
| CN | 204118410 U | 1/2015 |
| CN | 205428454 U | 8/2016 |
| CN | 205565818 U | 9/2016 |
| CN | 205812244 U | 12/2016 |
| CN | 206272271 U | 6/2017 |

* cited by examiner

CHARGER, ELECTRONIC DEVICE, CHARGING SYSTEM AND CHARGING METHOD

CROSS REFERENCE

The present application claims the priority of Chinese Patent Application No. 201710936889.8, filed on Oct. 10, 2017, and the entire contents thereof are incorporated herein by reference as part of the present application.

TECHNICAL FIELD

The present disclosure relates to the technical field for charging an electrical appliance, in particular, to a charger, an electronic device, a charging system and a charging method.

BACKGROUND

Intelligent display products such as intelligent picture frames and smart albums hanging on the wall are a new generation of products that integrate human-oriented and intelligent technologies into traditional digital displays. Intelligent picture frames, smart albums and the like often have characteristics of large screens, high definition, convenience for operation, and powerful functions. However, intelligent picture frames and smart photo albums are power-consuming products that need to be supplied or recharged by wires during use.

At present, an intelligent display product such as an intelligent picture frame and a smart album hanging on the wall requires the user to observe whether the power of the product is sufficient. In the case of low power, the user needs to manually insert the charging cable to charge. After the product is fully charged, the user needs to manually pull out the plug.

The above information disclosed in this Background section is only for enhancement of understanding the background of the present disclosure and therefore it may contain information that does not form the prior art that is already known to those skilled in the art.

SUMMARY

According to an aspect of the present disclosure, there is provided a charger including:
a base plate; and
a first charge terminal and a control circuit disposed on the base plate,
wherein, when the first charge terminal is connected with a charge plug, the first charge terminal switches from an extension position to a retraction position; and
the control circuit is configured to control the first charge terminal to be on-state when the first charge terminal is in the retraction position.

According to an embodiment, the first charge terminal is switched between the extension position and the retraction position slidably.

According to an embodiment, the first charge terminal may include a first charging electrode and a second charging electrode.

In an exemplary embodiment of the present disclosure, the charger may further include a support member configured to support the first charge terminal.

In this way, the first charge terminal may be in close contact with the charge plug since the first charge terminal is supported by the support member.

According to an embodiment, the support part includes an elastic part, a first end of the elastic part is disposed on the base plate and a second end thereof is connected with the first charge terminal.

In an exemplary embodiment of the present disclosure, the charger further includes a base located on the base plate which is provided with a rotating shaft and a rotating member capable of being rotated around the rotating shaft. The first charge terminal is located on a first end of the rotating member.

According to an embodiment, the rotating member and the first charge terminal may be separate members or may be integrated together.

In an exemplary embodiment of the present disclosure, a second end of the rotating member is connected with the elastic part configured to support the first charge terminal.

In an exemplary embodiment of the present disclosure, a via is provided on the rotating shaft, and the first end of the rotating member passes through the via and is connected with the first charge terminal.

As an example, if the first charge terminal includes a first charging electrode and a second charging electrode, the base may include a first supporting base corresponding to the first charging electrode and a second supporting base corresponding to the second charging electrode, and the elastic part may include a first elastic part corresponding to the first charging electrode and a second elastic part corresponding to the second charging electrode. In this case, according to an embodiment, the first charging electrode may be located on the first end of the first rotating member of the first supporting base and the second end of the first rotating member may be connected with the first elastic part. Similarly, the second charging electrode may be located on the first end of the second rotating member of the second supporting base and the second end of the second rotating member may be connected with the second elastic part.

In an exemplary embodiment of the present disclosure, a torque with respect to the rotating shaft which is generated by a weight of the second end of the rotating member is greater than a torque with respect to the rotating shaft which is generated by a weight of the first end of the rotating member.

In an exemplary embodiment of the present disclosure, the first end of the first charging electrode has an arched shape and the first end of the second charging electrode has an arched shape.

In an exemplary embodiment of the present disclosure, the charger may further include a pressure sensor configured to detect a pressure applied by the first charge terminal at different positions.

According to an embodiment, the pressure sensor may be disposed under the support member and configured to detect the pressure applied by the first charge terminal on the support member.

According to an embodiment, the control circuit is configured to control the first charge terminal whether to be on-state according to the pressure detected by the pressure sensor.

For example, the control circuit is configured to control the first charge terminal to be on-state when the pressure detected by the pressure sensor is greater than a first threshold.

In an exemplary embodiment of the present disclosure, a housing is provided on the base plate, an opening for the charge plug to pass through is provided on an upper portion of the housing, and the opening is provided with a guide part for directing the charge plug to pass through the opening and enter into the interior of the charger.

According to an aspect of the present disclosure, there is provided an electronic device including:

a charging cable;

a charge plug provided with a connection terminal for connecting the charging cable and a second charge terminal;

a movement controller configured to stow or release the charging cable according to the power of the electronic device.

According to an embodiment, the second charge terminal may include a first charge plug electrode and a second charge plug electrode.

In an exemplary embodiment of the present disclosure, the movement controller is configured to, when the power of the electronic device is lower than a first power level, release the charging cable such that the charge plug attempts a connection to the charge.

In an exemplary embodiment of the present disclosure, the movement controller is configured to, when the charger is charging the electronic device and the power of the electronic device reaches a second power level, stow the charging cable such that the charge plug is separated from the charger.

According to an embodiment, the movement controller may be an electrical motor.

In an exemplary embodiment of the present disclosure, the bottom surface of the charge plug is an arched surface and the second charge terminal has an arched shape to cover the arched surface.

In an exemplary embodiment of the present disclosure, the electronic device is an intelligent picture frame or a smart album.

According to an aspect of the present disclosure, there is provided a charging system including:

any one of the above mentioned chargers; and any one of the above mentioned electronic devices.

According to an aspect of the present disclosure, there is provided a charging method for any one of the above charging systems, the method may include the following steps.

A current power of an electronic device is detected.

When the power of the electronic device is less than a first power level, a charging cable of the electronic device is released, such that a charge plug connected with the charging cable attempts a connection to the charger.

When the power of the electronic device reaches a second power level, the charging cable is stowed such that the charge plug is separated from the charger.

BRIEF DESCRIPTION OF THE DRAWINGS

The above and other features and advantages will be more apparent by describing the example embodiments in detail when taken in reference to the drawings.

DETAILED DESCRIPTION

Figure 1:
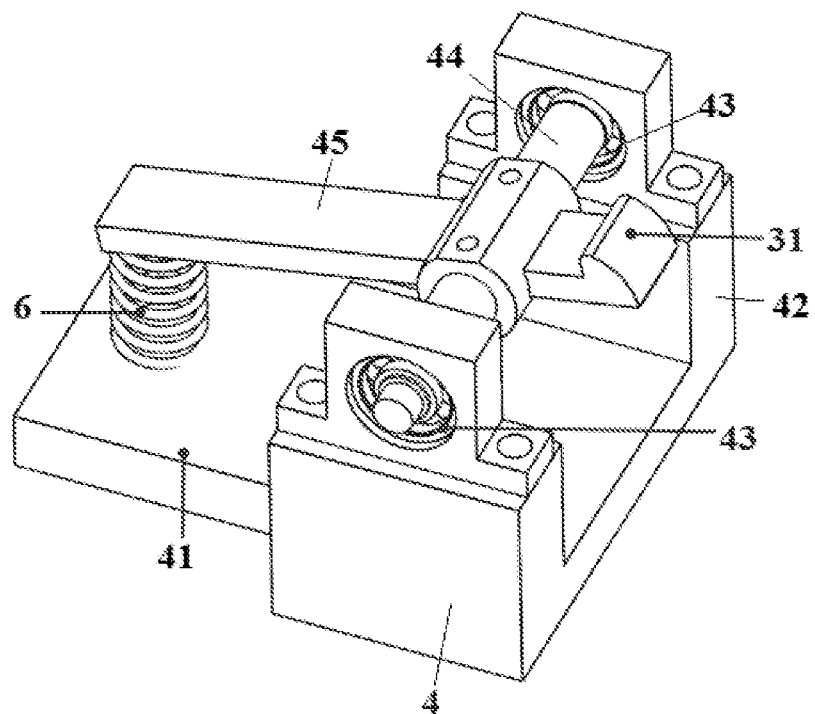
FIG. 1 is a structural schematic diagram illustrating a side of an example charger according to the present disclosure.

Example embodiments will now be described more fully with reference to the accompanying drawings. However, example embodiments can be implemented in various forms and should not be construed as being limited to the embodiments set forth herein; rather, these embodiments are provided so that this disclosure will be thorough and complete, and will fully convey the concept of the example embodiments for those skilled in the art. The same reference numbers in the drawings denote the same or similar structures, and thus their detailed description will be omitted.

The present disclosure provides a charger 3 including: a base plate 33; and a first charge terminal and a control circuit disposed on the base plate 33. When the first charge terminal is connected with a charge plug 2, the first charge terminal switches from an extension position to a retraction position, and the control circuit is configured to control the first charge terminal to be on-state when the first charge terminal is in the retraction position.

According to an embodiment, when the charger 3 is in an idle state, the first charge terminal may be in the extension position and the distance between the first charge terminal and the base plate 33 is a first distance.

When the first charge terminal is connected with the charge plug 2, the distance between the first charge terminal and the base plate 33 is decreased to a second distance, and accordingly, the first charge terminal is switched from the extension position to the retraction position.

The charger 3 may further include a support member configured to support the first charge terminal, such that the first charge terminal may be in close contact with the charge plug 2 since the first charge terminal is supported by the support member.

According to an embodiment, the support part may include an elastic part, a first end of the elastic part is disposed on the base plate 33 and a second end thereof is connected with the first charge terminal.

The charger 3 may further include a base located on the base plate 33 which is provided with a rotating shaft and a rotating member capable of being rotated around the rotating shaft. The first charge terminal is located on a first end of the rotating member and a second end of the rotating member is connected with the elastic part configured to support the first charge terminal.

The first charge terminal may include a first charging electrode 31 and a second charging electrode 32, the base may include a first supporting base 4 corresponding to the first charging electrode 31 and a second supporting base 5 corresponding to the second charging electrode 32, and the elastic part may include a first elastic part corresponding to the first charging electrode 31 and a second elastic part corresponding to the second charging electrode 32.

According to an embodiment, the first charging electrode 31 may be located on the first end of the first rotating member 45 of the first supporting base 4 and the second end of the first rotating member 45 may be connected with the first elastic part. Similarly, the second charging electrode 32 may be located on the first end of the second rotating member 55 of the second supporting base 5 and the second end of the second rotating member 55 may be connected with the second elastic part.

Figure 3:
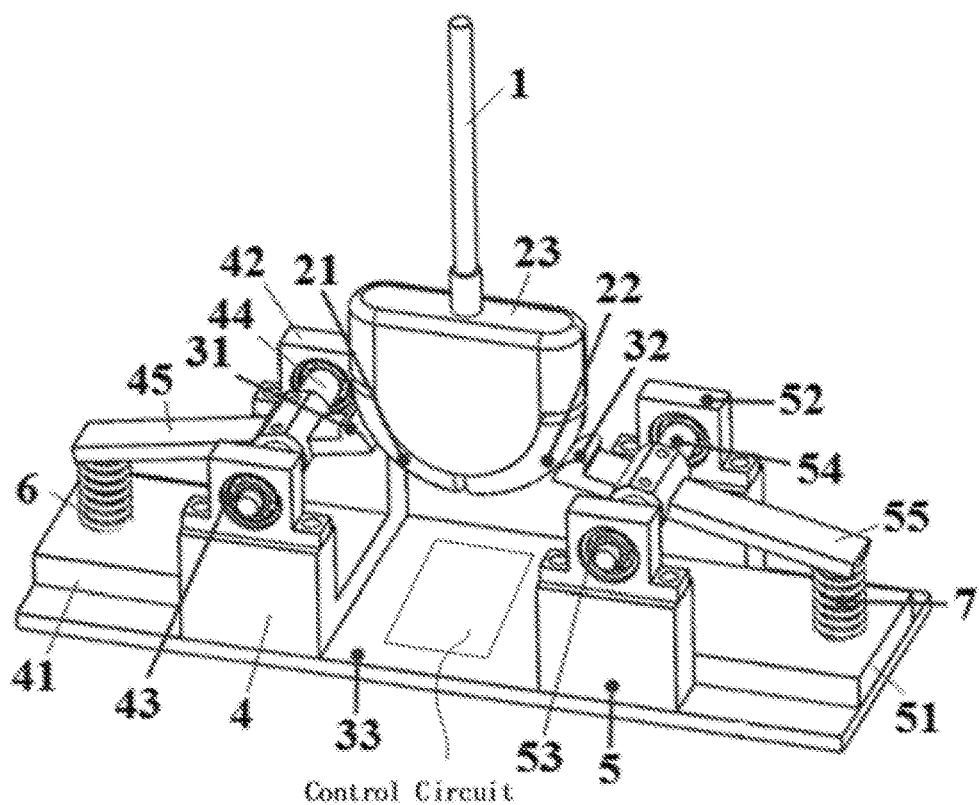
FIG. 3 is a structural schematic diagram illustrating the structure of the charger in FIG. 1 without the housing.

Referring to the structure of the charger as shown in FIGS. 1 and 3 when the housing 34 is removed, in the example embodiment, the base plate 33 may be provided with a first supporting base 4 and a second supporting base 5 symmetrically. The first supporting base 4 may include a first supporting base plate 41 and two first side plate 42 which are disposed on the front and rear sides of the first supporting base plate 41 respectively. The two first side plate 42 may be provided with two first bearings 43 that are symmetrical to each other. A first rotating shaft 44 penetrates each first bearing 43. A first rotating member 45 is disposed on the first rotating shaft 44. In particular, the rotating shaft 44 is provided with a via, and the first end of the rotating member 45 passes through the via and is connected with the first charging electrode 31. The first rotating member 45 has a strip shape having a first end and a second end. A central axis of the first rotating member 45 may be perpendicular to a central axis of the first rotating shaft 44 and the first rotating member 45 may be capable of being rotated around the first rotating shaft 44. The first charging electrode 31 is located on the first end of the first rotating member 45. The first end of the first rotating member 45 may have an arched shape and the bottom surface of the first end of the first rotating member 45 may be protruded from its top surface. The side surface connected between the top surface and the bottom surface is an arched surface and this arched surface is gradually protruded from the top to the bottom. The first charging electrode 31 may have an arched sheet shape to cover the first end of the first rotating member 45. A first elastic part may be connected between the second end of the first rotating member 45 and the first supporting base plate 41 and may be a first spring 6.

The structures of the second supporting base 5 and the first supporting base 4 may be symmetrical to each other. The second supporting base 5 may include a second supporting base plate 51 and two second side plate 52 which are disposed on the front and rear sides of the second supporting base plate 51 respectively. The two second side plate 52 may be provided with two second bearings 53 that are symmetrical to each other. A second rotating shaft 54 penetrates each second bearing 53. A second rotating member 55 is disposed on the second rotating shaft 54. In particular, the rotating shaft 54 is provided with a via, and the first end of the second rotating member 54 passes through the via and is connected with the second charging electrode 32. The second rotating member 55 has a strip shape having a first end and a second end. A central axis of the second rotating member 55 may be perpendicular to a central axis of the second rotating shaft 54 and the second rotating member 55 may be capable of being rotated around the second rotating shaft 54. The second charging electrode 32 is located on the first end of the second rotating member 55. The first end of the second rotating member 55 may have an arched shape and the bottom surface of the first end of the second rotating member 55 may be protruded from its top surface. The side surface connected between the top surface and the bottom surface is an arched surface and this arched surface is gradually protruded from the top to the bottom. The second charging electrode 32 may have an arched sheet shape to cover the first end of the first rotating member 45. A second elastic part may be connected between the second end of the second rotating member 55 and the second supporting base plate 51 and may be a second spring 7.

The first end of the first rotating member 45 has an arched surface that is gradually protruded from the top to the bottom, and the first end of the second rotating member 55 is also arranged in an arched surface that is gradually protruded from the top to the bottom, such that an opening which has a wider upper portion and a narrower bottom portion is formed between the first end of the first rotating member 45 and the first end of the second rotating member 55. This may facilitate the charge plug 2 to enter the opening and prevent the charge plug 2 from being stuck, and can further limit the displacement of the charge plug 2, such that the electrode on the charge plug 2 can be closely matched with the electrode on the charger 3 for charging. The arrangement of the arched shape may avoid the impact between the charge plug 2 and the edges of the first end of the first rotating member 45 and the first end of the second rotating member 55, thereby preventing damage of the electrodes on the charge plug and the charger.

Figure 4:
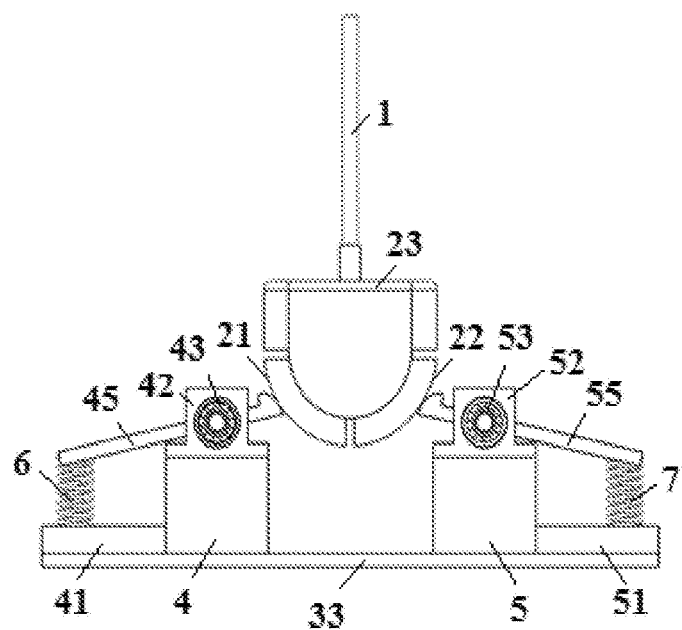
FIG. 4 is a schematic diagram illustrating the structure when the charge plug and the charger in FIG. 2 are in contact.
Figure 5:
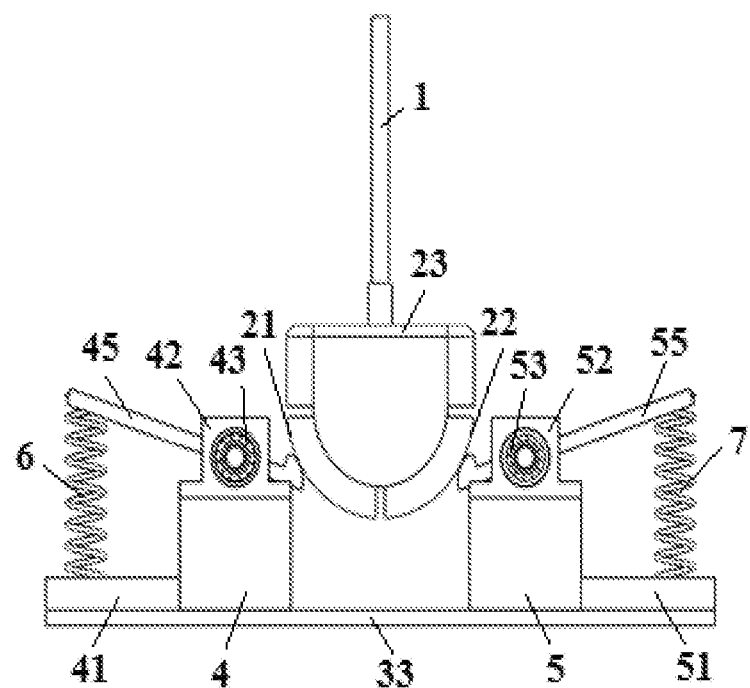
FIG. 5 is a schematic diagram illustrating the structure when the charge plug in FIG. 2 pushes the first charging electrode and the second charging electrode down.

The first rotating shaft 44 and the first rotating member 45 may form a leverage structure, where the first rotating shaft 44 is formed as a fulcrum. The second rotating shaft 54 and the second rotating member 55 may also form a leverage structure, where the second rotating shaft 54 is formed as a fulcrum. Referring to the structure when the charge plug 2 and the charger 3 are just in contact as shown in FIG. 4, when the charge plug 2 falls down, a downward pressure may be applied to the first end of the first rotating member 45 and the first end of the second rotating member 55. In the case where the spring is not arranged, the force applied by the first rotating member 45 and the second rotating member 55 may be turned immediately and this may result in that the first charge plug electrode 31 and the second charge plug electrode 32 on the charge plug 2 are not in close contact with the first charging electrode 31 and the second charging electrode 32 on the charger 3. In the case where the spring is arranged, the first spring 6 may apply a downward traction force to the second end of the first rotating member 45 and the first end of the first rotating member 45 may apply a reaction force to the charge plug 2, such that the first rotating member 45 will not be turned immediately. In addition, the second spring 7 may apply a downward traction force to the second end of the second rotating member 55 and the first end of the second rotating member 55 may apply a reaction force to the charge plug 2, such that the second rotating member 55 will not be turned immediately. In this way, the first charge plug electrode 21 and the second charge plug electrode 22 on the charge plug 2 may be in close contact with the first charging electrode 31 and the second charging electrode 32 on the charger 3, and moreover the first rotating member 45 and the second rotating member 55 arrive at a balance state as soon as possible, so as to start charging.

In addition, in other example implementation of the present disclosure, there may be provided additional weights on the second end of the first rotating member 45 and the second end of the second rotating member 55 to replace the springs. The downward pressure may also be applied by the weights to the second end of the first rotating member 45 and the second end of the second rotating member 55. Likewise, the first rotating member 45 and the second rotating member 55 have the leverage structure, and the weight of the second end of the second rotating member 55 may be greater than the weight of the first end of the second rotating member 55 if the weight of the second end of the first rotating member 45 is greater than the weight of the first end of the first rotating member 45, and the effect of the additional weight can be achieved by the own weight of the second end of the first rotating member 45 and the own weight of the second end of the second rotating member 55. Moreover, it is not necessary to have the weight of the second end of the first rotating member 45 be greater than the weight of the first end of the first rotating member 45 and have the weight of the second end of the second rotating member 55 be greater than the weight of the first end of the second rotating member 55. Since the first rotating member 45 and the second rotating member 55 have the leverage structure, the above effect can be arrived at by adjusting the moment arms, that is, in case when the distance from the fulcrum of the first rotating member 45 to the moment arm of its first end is greater than the distance from the fulcrum to the moment arm of a second end thereof, the weight of the second end of the first rotating member 45 may be less than or equal to the weight of the first end of the first rotating member 45, so long as the torque with respect to the first rotating shaft 44 which is generated by the weight of the second end of the first rotating member 45 is greater than the torque with respect to the first rotating shaft 44 which is generated by the weight of the first end of the first rotating member 45. The same can be applied to the second rotating member 55, so long as the torque with respect to the second rotating shaft 54 which is generated by the weight of the second end of the second rotating member 55 is greater than the torque with respect to the second rotating shaft 54 which is generated by the weight of the first end of the second rotating member 55.

It is appreciated for those skilled in the art that the first charging electrode 31 and the second charging electrode 32 do not have to be completely symmetrical in configuration, and one of them may have a spring structure and the other may have a weight structure, or one of them may have a weight structure and other may have the structure using its own weight. Various combinations can be adopted and this will not be illustrated here. The configuration of the first charging electrode 31 and the second charging electrode 32 may not adopt the above structural combination of the base, the bearing and the rotating shaft, while a support part may be disposed under the at least one of the first charging electrode 31 and the second charging electrode 32 and this support part may be an elastic part, such as a spring, an elastic plate or the like. One end of the spring or the elastic plate is connected with the base plate and other end is connected with the first charging electrode 31 and/or the second charging electrode 32, such that the first charging electrode 31 and the second charging electrode 32 can be moved upward and downward under the elastic force. That is to say, at the time of being in the idle state, the distance between the first and the second charging electrodes 31 and 32 and the base plate is a first distance, and when the first charging electrode 31 and the second charging electrode 32 are connected with the charge plug 2, the distance between the first and the second charging electrodes 31 and 32 and the base plate is decreased to a second distance.

In the example implementation, the first end of the first rotating member 45 and the first end of the second rotating member 55 are extended into the opening. That is to say, when vertically viewing from the upper portion of the opening to the charger 3, the first end of the first rotating member 45 and the first end of the second rotating member 55 are protruded into the opening, such that the first and the second charging electrodes 31 and 32 are protruded into the opening, which facilitates the contact to the first charge plug electrode 21 and the second charge plug electrode 22 for charging.

Figure 6:
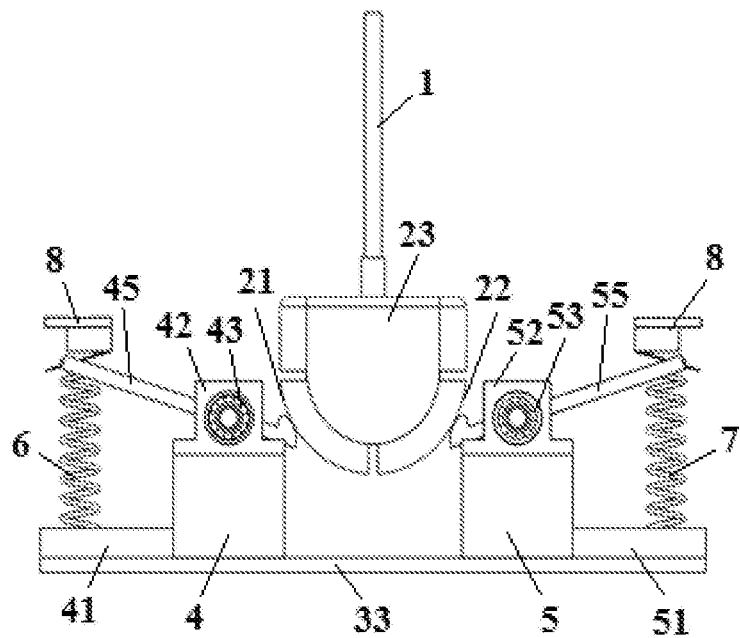
FIG. 6 is a schematic diagram illustrating the structure at charging stage after the charge plug in FIG. 2 pushes the first charging electrode and the second charging electrode down.

Further, the charger may further include a pressure sensor 8 configured to detect a pressure applied by the first charge terminal at different positions. The control circuit s configured to control the first charge terminal to be turned on according to the pressure detected by the pressure sensor 8. For example, the control circuit is configured to control the first charge terminal to be on-state when the pressure detected by the pressure sensor 8 is greater than a first threshold. Referring to the schematic diagram as shown in FIG. 6, which illustrates the structure at charging stage after the charge plug 2 pushes the first charging electrode 31 and the second charging electrode 32 down, in the example implementation, a first threshold is stored in the control circuit, and there is provided with two pressure sensors 8 which are inside the top plate of the housing 34 and right above the springs respectively. When the charge plug 2 pushes the first end of the first rotating member 45 and the first end of the second rotating member 55 down, the second end of the first rotating member 45 and the second end of the second rotating member 55 will raise. When the charge plug 2 is inserted into a predetermined depth, the second end of the first rotating member 45 and the second end of the second rotating member 55 may be in contact with the pressure sensor 8 and the pressure sensor 8 may send a pressure signal to the control circuit. After the pressure signal is received by the control circuit, a pressure value corresponding to the pressure signal may be compared with the first threshold. When the pressure is greater than the first threshold, the control circuit controls the first charge terminal to be on-state and at this time, it is started to charge the charge plug 2 connected with the first charging electrode 31 and the second charging electrode 32. The pressure sensor 8 may check whether the charge plug 2 is inserted into position and start to charge, so as to avoid the charging in the case where the charge plug 2 is not inserted into position, thereby reducing power loss and saving power. Alternatively, there may be provided with one pressure sensor 8 which is arranged on the insertion position of the charge plug 2 of the charger 3 directly. This single pressure sensor 8 may be arranged on the position with a desired depth required for inserting the charge plug 2 and when the charge plug 2 is inserted into this position, the charge plug 2 may be in contact with the pressure sensor 8, such that the pressure sensor 8 may send a pressure signal and the control circuit may control the charger to start charging.

Figure 2:
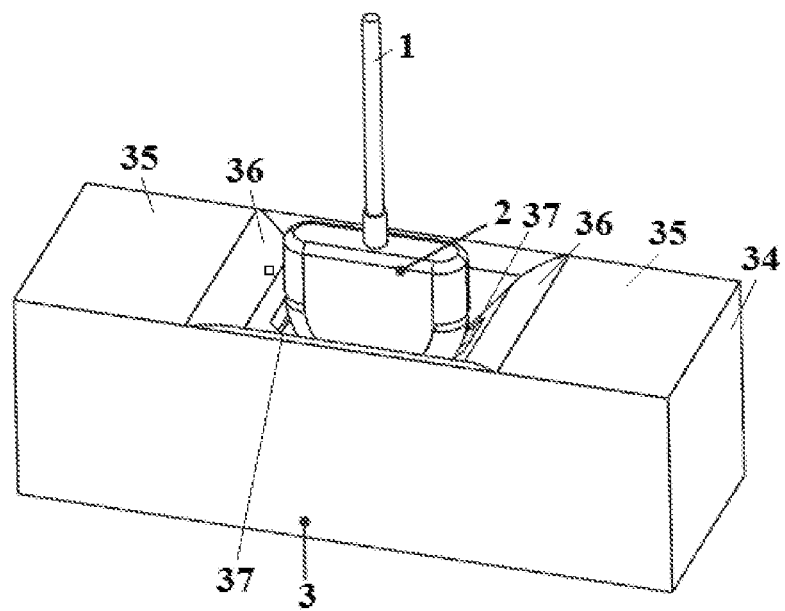
FIG. 2 is a structural schematic diagram illustrating an example charging system according to the present disclosure.

Referring to the structural schematic diagrams as shown in FIGS. 1, 2 and 3, in the example implementation, the charger 3 may have a rectangular shape and may include a base plate 33 and a housing 34 coupled to the base plate 33. The base plate 33 may have a rectangular plate shape, and the housing 3 may be a rectangular box without the bottom that can be coupled to the base plate 33. There is provided with an opening on the upper portion of the housing 34 which is used for the charge plug 2 to pass through, that is, the opening is provided on the top plate of the housing 34. Specifically, the top plate may include two flat plates 35 arranged on its both sides and two inclined plates 36 which are symmetrically connected with the two flat plates 35 respectively. There is provided with a gap between the two inclined plates 36 which constitutes the opening for the charge plug 2 to pass through. The two inclined plates 36 are facing to the inside of the opening and are inclined downward, such that the opening may be formed as a V-shaped opening with a wider upper portion and a narrower bottom portion. There may be provided with a guide groove 37 for directing the charge plug 2. Specifically, there is provided with two guide grooves 37 which are disposed on both sides of the inclined plates 36 symmetrically. The orientation of the guide grooves 37 is consistent with the inclined orientation of the inclined plates 36.

The opening is arranged as a V-shaped opening with a wider upper portion and a narrower bottom portion. The wider upper portion can facilitate the charge plug 2 to be inserted into the opening and the narrower bottom portion can limit the displacement of the charge plug 2, such that the electrodes on the charge plug 2 can be matched with the electrodes on the charger 3 closely for charging. Arrangement of the guide grooves 37 may not only provide direction for inserting the charge plug 2 into the charger 3, but also prevent the charge plug 2 from being turned when inserted into the charger 3, thereby avoid the misplacement between the electrodes of the charge plug 2 and the electrodes of the charger 3. In addition, it is appreciated for those skilled in the art that the shape of the charger 3 can be formed as various shapes such as a square shape, a circular shape, an elliptic shape or the like according to actual needs, or the charger 3 may be formed of the transparent or non-transparent materials. Alternatively, there may not be provided with the inclined plates 36 and may be directly provided with the guide grooves 37 on the flat plate 35.

The present disclosure also provides an electronic device including a charging cable 1, a charge plug 2 and a movement controller. The charge plug 2 is provided with a connection terminal for connecting the charging cable 1 and a second charge terminal. The movement controller is configured to stow or release the charging cable according to the power of the electronic device.

According to an embodiment, the second charge terminal may include a first charge plug electrode 21 and a second charge plug electrode 22.

The movement controller is configured to, when the power of the electronic device is lower than a first power level, release the charging cable 1 such that the charge plug 2 attempts a connection to the charger.

When the charger is charging the electronic device and the power of the electronic device reaches a second power level, the movement controller is configured to stow the charging cable 1 such that the charge plug 2 is separated from the charger.

In the example implementation, the charge plug may further include a charge plug body 23 which may have a flat shape. There may be provided with two arched surfaces on two sides that are opposite to each other in the width direction of the charge plug body 23. The first charge plug electrode 21 and the second charge plug electrode 22 have an arched shape to cover the arched surfaces. The arched first charge plug electrode 21 and the arched second charge plug electrode 22 are matched with the arched first charging electrode 31 and the arched second charging electrode 32 with a smooth contact there-between, which may prevent sticking, thereby facilitating the insertion of the charge plug 2 into the charger 3. The shape of the charge plug 2 is not intended to be limited to the above description and the charge plug 2 may also have an elliptic shape, a circular shape and the like, so long as the charge plug 2 is provided with the first charge plug electrode 21 and the second charge plug electrode 22 that are adaptable for the first charging electrode 31 and the second charging electrode 32 respectively.

According to an embodiment, the movement controller may be an electrical motor. The first end of the charging cable 1 can be moved upward and downward by the electrical motor. In the example implementation, the electrical motor is provided with an output shaft, a rotating drum can be arranged on the output shaft, and the charging cable 1 can be wound on the rotating drum. When the electrical motor rotates in the forward direction, the output shaft rotates the rotating drum, and the rotating drum winds the charging cable 1 on the rotating drum to move the charge plug 2 upward. When the electrical motor rotates in the reverse direction, the output shaft drives the rotating drum, and the rotating drum releases the charging cable 1 to move the charge plug 2 downward.

In the example implementation, the electronic device may be an intelligent picture frame or a smart album, and the present disclosure is not intended to limit thereto. The electronic device may also be a smart display device, a smart home appliance or the like.

The present disclosure further provides a charging system including the above-mentioned charger 3 and the above-mentioned electronic device. The structures of the charger 3 and the electronic device have been described in detail and the repeated description will be omitted.

The present disclosure further provides a charging method for the above charging system, the method may include the following steps.

In step S1, a current power of an electronic device is detected.

In step S2, when the power of the electronic device is less than a first power level, a charging cable 1 of the electronic device is released such that a charge plug 2 connected with the charging cable 1 attempts a connection to the charger.

In step S3, when the power of the electronic device is charged to arrive at a second power level, the charging cable 1 is stowed such that the charge plug 2 is separated from the charger 3.

The charging method for the charging system of the present disclosure is described in detail as follows.

Figure 7:
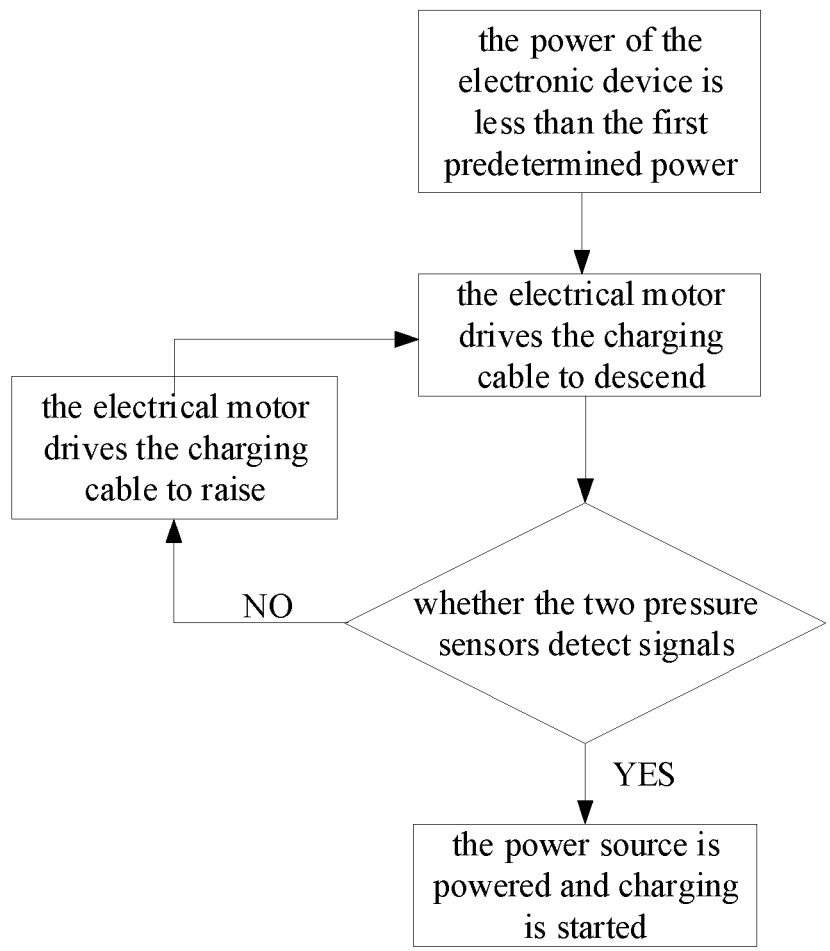
FIG. 7 is a flowchart illustrating the charging process of the charger according to the present disclosure.

Referring to the flowchart as shown in FIG. 7, which illustrates the charging process of the charger 3 according to the present disclosure. When the power of the electronic device is less than a predetermined first power level, which may be 5%, 8%, etc. of the total power, the electrical motor drives the charging cable 1 to descend and the charge plug 2 automatically moves downward by its own weight, such that the first charge plug electrode 21 and the second charge plug electrode 22 are in contact with the first charging electrode 31 and the second charging electrode 32 respectively, and the first charging electrode 31 and the second charging electrode 32 are pushed down to move downward. The downward movement of the first charging electrode 31 and the second charging electrode 32 makes the second end of the first rotating member 45 and the second end of the second rotating member 55 be in contact with the pressure sensor 8, and after a pressure is detected by the pressure sensor 8, the power source powers the charger 3 to charge the electronic device. When no pressure is detected by the pressure sensor 8, the electrical motor is controlled to drive the charging cable 1, so as to raise the charge plug 2 to a higher position, and then controls the electrical motor to drive the charging cable 1 to descent, and at this time, charging is not started until a pressure signal is sensed by the pressure sensor 8.

Figure 8:
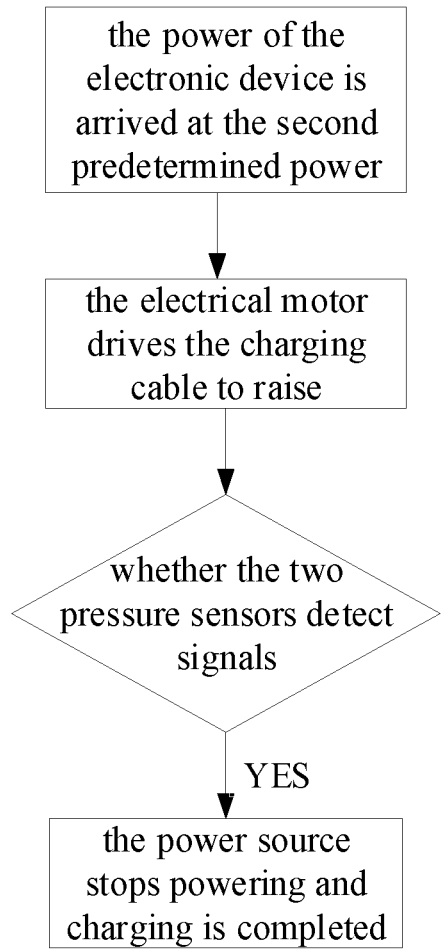
FIG. 8 is a flowchart illustrating the charge completion of the charger according to the present disclosure.

Referring to the flowchart as shown in FIG. 8, which illustrates the charge completion of the charger 3 according to the present disclosure, when the electronic device is charged to arrive at a predetermined second power level, the said predetermined second power level may be a fully charged power, the electrical motor drives the charging cable 1 to raise, such that the charge plug 2 can be moved upward by the charging cable 1. After a signal representing that the pressure disappears is detected by the pressure sensor 8, the power source is controlled to stop powering, and the charge plug 2 is moved upward, such that the first charge plug electrode 21 and the second charge plug electrode 22 are departed from the first charging electrode 31 and the second charging electrode 32 and charging is completed.

The present disclosure provides a charger 3 including a base plate 33, a support part, a first charging electrode 31 and a second charging electrode 32. The support part is disposed on the base plate 33, and the first charging electrode 31 and the second charging electrode 32 are disposed on the support part. When the first charging electrode 31 and the second charging electrode 32 are pressed by the charging electrodes of the object to be charged, the first charging electrode 31 and the second charging electrode 32 are moved downward and are supported by the support part, such that the first charging electrode 31 and the second charging electrode 32 are in close contact with the charging electrodes of the object to be charged.

Further, the support part includes at least one elastic part, and a first charging electrode 31 and a second charging electrode 32 are moved upward and downward under the elastic force of the elastic part.

In the example implementation, the charger 3 may further include a base on the base plate 33. A first supporting base 4 and a second supporting base 5 are provided with a first rotating shaft 44 and a second rotating shaft 54 respectively. The first charging electrode 31 is located on a first end of a first rotating member 45 that can be rotated around the first rotating shaft 44, and the second charging electrode 32 is located on a first end of a second rotating member 55 that can be rotated around the second rotating shaft 54.

At least one of a second end of the first rotating member 45 and a second end of the second rotating member 55 is connected with the support part.

According to an embodiment, a torque with respect to the first rotating shaft 44 which is generated by the weight of the second end of the first rotating member 45 is greater than a torque with respect to the first rotating shaft 44 which is generated by the weight of the first end of the first rotating member 45, and a torque with respect to the second rotating shaft 54 which is generated by the weight of the second end of the second rotating member 55 is greater than a torque with respect to the second rotating shaft 54 which is generated by the weight of the first end of the second rotating member 55.

According to an embodiment, the first end of the first charging electrode 31 has an arched shape and the first end of the second charging electrode 32 has an arched shape.

In addition, the charger 3 may further include a pressure sensor 8 and a control circuit. The pressure sensor 8 senses the downward movement of the first charging electrode 31 and the second charging electrode 32. The control circuit controls the charger 3 to charge the device to be charged according to the signal sensed by the pressure sensor 8.

In addition, there is provided a housing 34 on the base plate 33, an upper portion of which is provided with an opening for the charge plug 2 to pass through. The first charging electrode 31 and the second charging electrode 32 are extended to the opening and matched with the first charge plug electrode 21 and the second charge plug electrode 22 respectively. There is provided with guide grooves 37 for directing the charge plug 2 on both sides of the opening. The present disclosure further provides an electronic device which includes a charge plug 2 and a movement controller. The charge plug 2 are moveable upward and downward and are provided with a first charge plug electrode 21 and the second charge plug electrode 22 corresponding to the first charging electrode 31 and the second charging electrode 32 respectively. The charge plug is connected with the electronic device via a charging cable 1. The movement controller is configured to, when the power of the electronic device is lower than a predetermined first power level, move the charge plug 2 downward, such that the first charge plug electrode 21 and the second charge plug electrode 22 are in contact with the first charging electrode 31 and the second charging electrode 32 respectively, and the first charging electrode 31 and the second charging electrode 32 are pushed down to be moved downward, thereby charging the electronic device.

According to an embodiment, the movement controller is configured to, when the electronic device is charged to reach a predetermined second power level, move the charge plug 2 upward, such that the first charge plug electrode 21 and the second charge plug electrode 22 are departed from the first charging electrode 31 and the second charging electrode 32 respectively.

According to an embodiment, the electronic device may further include an electrical motor which drives under the control of the movement controller to move the charging cable 1 to be moved downward or upward, thereby pulling the charge plug 2 to be moved upward or downward.

According to an embodiment, the charge plug 2 may further include a charge plug body 23 which is provided with two arched surfaces on its both sides that are opposite to each other. The first charge plug electrode 21 and the second charge plug electrode 22 have an arched shape to cover the arched surfaces.

In the example implementation, the electronic device may be an intelligent picture frame or a smart album.

The present disclosure further provides a charging system including the above charger 3 and the above electronic device.

The present disclosure still further provides a charging method for the above charging system, which includes the following steps.

In step 1, a current power of an electronic device is detected.

In step 2, when the power of the electronic device is less than a first power level, the charge plug 2 is moved downward, such that the first charge plug electrode 21 and the second charge plug electrode 22 are in contact with the first charging electrode 31 and the second charging electrode 32 respectively, and the first charging electrode 31 and the second charging electrode 32 are pressed to be moved downward, thereby charging the electronic device.

In step 3, when the power of the electronic device is charged to arrive at a predetermined second power level, the charge plug 2 is moved upward, such that the first charge plug electrode 21 and the second charge plug electrode 22 are departed from the first charging electrode 31 and the second charging electrode 32.

As can be seen from the above technical solution, the present disclosure possesses at least one of the following advantages and the positive effects.

In the charger of the present disclosure, the distance between the first and second charging electrodes and the base plate is changeable. When the charger is in an idle state, the distance between the first charge terminal and the base plate is a first distance, and the distance between the first charge terminal and the base plate is decreased to a second distance when charging is required.

In the electronic device of the present disclosure, the charge plug is connected with the charging cable. The movement controller is capable of stowing or releasing the charging cable, so as to control the charge plug to be moved upward or downward. Thereby, there is no need to pull the plug manually and thereby improving the degree of intelligence.

The above features, structures or characteristics may be combined into one or more implementations in any suitable manner and the features discussed in embodiments are interchangeable if possible. In the above description, numerous specific details are provided to provide a thorough understanding of the embodiments of the present disclosure. However, it is appreciated for those skilled in the art that the technical solutions of the present disclosure may be practiced without one or more of the specific details described, or other methods, components, materials, or the like may be employed to practice the technical solutions of the present disclosure. In other instances, well-known structures, materials, or operations are not shown or described in detail to avoid obscuring aspects of the present disclosure.

Although relative terms are used in the present specification, for example, "on" and "under" to describe the relative relationship of one component to another component, these terms are used in this specification for convenience only, for example, according to the direction of the example shown in the drawing. It will be understood that if the illustrated device is turned upside down, the component described as "being on the upper portion" will become the component described as "being on the bottom portion". Other relative terms such as "top", "bottom", "front" and "back" also have similar meanings. When a structure is "on" other structures, it may mean that a structure is integrated on other structure, or that a structure is "directly" disposed on other structure, or that a structure is "indirectly" disposed on other structure through another structure.

In this specification, the terms "a", "an", "the", "said", and "at least one" are used to indicate the presence of one or more elements/components; the terms "comprising", "including", and "having" may include an open-ended meaning and there may be additional elements/components in addition to the listed elements/components; the terms "first", "second", "third" and the like are used only as labels, not as a limitation on the number of objects.

It should be understood that this disclosure does not limit its application to the detailed structure and arrangement of the components set forth in this specification. The present disclosure may have other embodiments and may be practiced and carried out in various ways. The foregoing variations and modifications fall within the scope of the present disclosure. It should be understood that the disclosure disclosed and defined in this specification extends to all alternative combinations of two or more of the individual features mentioned or evident from the text and/or drawings. All of these different combinations constitute various alternative aspects of the present disclosure. The embodiments described in this specification illustrate the best modes known for practicing the disclosure and will enable others skilled in the art to utilize the disclosure.

What is claimed is:

1. A charger, comprising:
   a base plate; and
   a first charge terminal and a control circuit both disposed on the base plate,
   wherein, when the first charge terminal is connected with a charge plug, the first charge terminal is configured to switch from an extension position to a retraction position in response to a pressure applied by the first charge terminal; and
   the control circuit is configured to control the first charge terminal to be on-state when the first charge terminal is in the retraction position.

2. The charger according to claim 1, further comprising an elastic part configured to support the first charge terminal,
   wherein a first end of the elastic part is disposed on the base plate and a second end of the elastic part is connected with the first charge terminal.

3. The charger according to claim 1, further comprising a base located on the base plate, wherein the base is provided with a rotating shaft and a rotating member selectively rotating around the rotating shaft, wherein the first charge terminal is located on a first end of the rotating member.

4. The charger according to claim 3, wherein a second end of the rotating member is connected with an elastic part, wherein the elastic part is configured to support the first charge terminal.

5. The charger according to claim 3, wherein a torque with respect to the rotating shaft and generated by a weight of the second end of the rotating member is greater than a torque with respect to the rotating shaft and generated by a weight of the first end of the rotating member.

6. The charger according to claim 3, wherein a via is provided on the rotating shaft, and the first end of the rotating member passes through the via and is connected with the first charge terminal.

7. The charger according to claim 3, wherein the first charge terminal comprises a first charging electrode and a second charging electrode, and the base comprises a first supporting base corresponding to the first charging electrode and a second supporting base corresponding to the first charging electrode.

8. The charger according to claim 1, further comprising:
   a pressure sensor configured to detect a pressure applied by the first charge terminal at different positions; and
   wherein the control circuit is configured to control the first charge terminal to be on-state when the pressure detected by the pressure sensor is greater than a first threshold.

9. The charger according to claim 1, wherein a housing is provided on the base plate, an opening for the charge plug to pass through is provided on an upper portion of the housing, and the opening is provided with a guide part for directing the charge plug to pass through the opening and to enter into the interior of the charger.

10. A charging system, comprising:
    a charger according to claim 1; and
    an electronic device, comprising:
    a charging cable;
    a charge plug provided with a connection terminal for connecting the charging cable and a device charge terminal;
    a movement controller configured to stow or release the charging cable according to the power of the electronic device.

* * * * *